Feb. 15, 1966 T. E. GILMER, JR 3,235,023
GUIDANCE SYSTEM FOR LAND-WORKING MACHINERY
Filed Sept. 5, 1961
3 Sheets-Sheet 1

INVENTOR
Thomas E. Gilmer, Jr.

BY C. M. Rose

ATTORNEY

Feb. 15, 1966     T. E. GILMER, JR     3,235,023
GUIDANCE SYSTEM FOR LAND-WORKING MACHINERY

INVENTOR
*Thomas E. Gilmer, Jr.*

BY

ATTORNEY

Feb. 15, 1966 T. E. GILMER, JR 3,235,023
GUIDANCE SYSTEM FOR LAND-WORKING MACHINERY
Filed Sept. 5, 1961 3 Sheets-Sheet 3
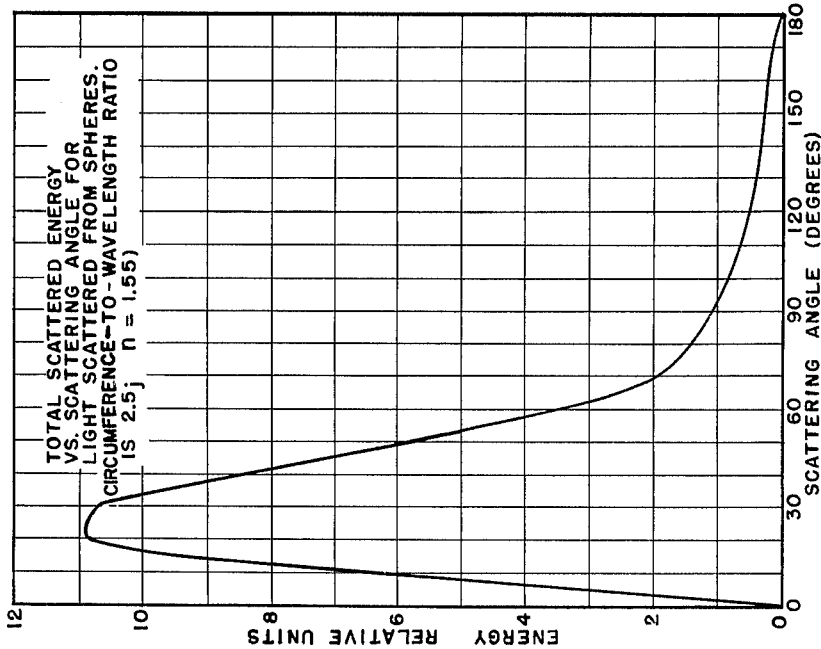
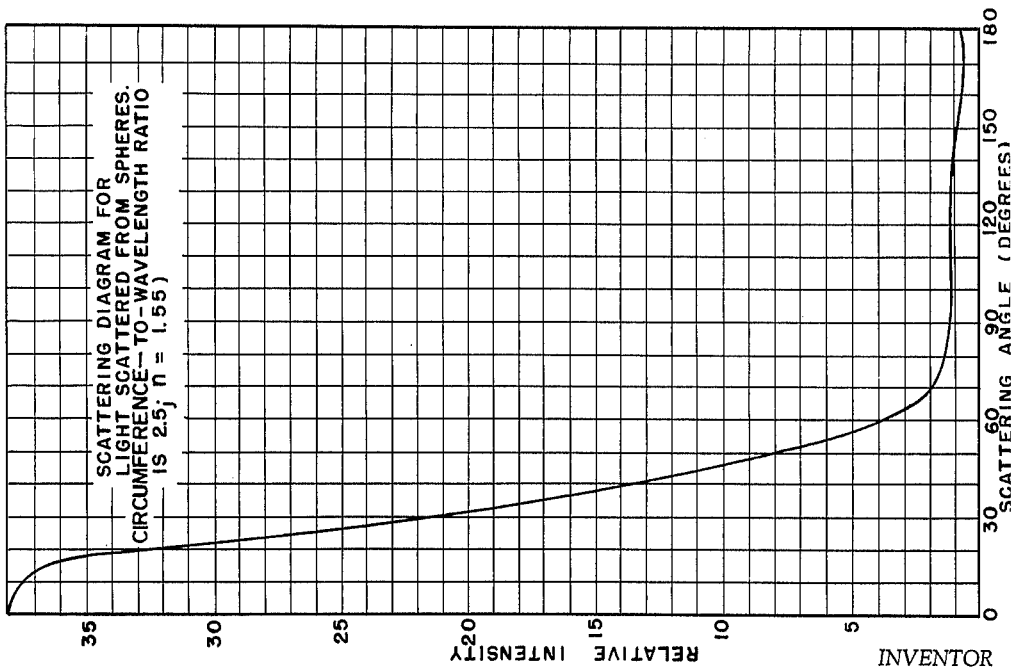
INVENTOR
Thomas E. Gilmer, Jr.
BY
ATTORNEY United States Patent Office 3,235,023
Patented Feb. 15, 1966

3,235,023
GUIDANCE SYSTEM FOR LAND-WORKING
MACHINERY
Thomas E. Gilmer, Jr., Montgomery, Va.
(909 Preston Ave., Blacksburg, Va.)
Filed Sept. 5, 1961, Ser. No. 137,712
8 Claims. (Cl. 180—79)

My invention relates generally to mobile, off-the-road, land-working equipment, and has particular applicability to the provision of such equipment in manner and with appropriate control such that the equipment, following initial and memory-storage phase, is virtually automatic in subsequent operation, without necessity for operator-control. It also concerns a method for accomplishing the foregoing.

An object of my invention, then, is to provide off-the-road land-working equipment which is capable of self-guided travel following initial, memory-storage pass, and this in sensitive and close response to directional signals automatically imparted thereto, which equipment, together with its related controls, is comparatively simple, rugged, self-contained, both tamper and fool-proof, and which involves so little additional cost, both initially and in maintenance, over ordinary manually-controlled equipment as to render it entirely competitive with such equipment, when viewed from economic standpoint.

Another object is to provide a control system for the automatic guidance of off-the-road, mobile land-working equipment over pre-determined area, which system is comparatively simple, involving relatively uncomplicated electrical circuitry, and which is readily provided, mounted and serviced, with low investment, both initially and during use, and which is highly reliable in operation.

Yet another object is to provide a method for the automatic guidance of off-the-road mobile land-working equipment, both for home owners' use and for industrial service, following initial pass of such equipment, to delineate the outer periphery of the area to be serviced; which method is at once simple, reliable, certain, involving the use of a minimum quantity of material for defining guidance path, and involving use of equipment which itself is comparatively simple, inexpensive and reliable, even upon exposure to wide extremes of service demand.

Other objects and advantages will in part be obvious and in part more fully pointed out hereinafter, during the course of the following description.

Accordingly, my invention may be considered as residing in the several parts, elements, assemblies and features of construction; in the relation of the foregoing not only with respect to each other, but as associated to and in combination with the mobile land-working equipment on which they are mounted; and as well, the mode and manner of operating the same, the scope of the application of all of which is more fully set forth in the claims at the end of this disclosure.

In the several views of the drawings, wherein I have disclosed that embodiment of my invention which I prefer at present, and by way of illustration:

FIGURES 1 and 2 respectively disclose, in side elevation and top plan view, a power-driven lawn mower utilizing guidance system responding to the foregoing general description;

In FIGURES 3 and 4 I disclose, somewhat schematically, in side elevation and in top plan, respectively, the relationship between the light source, the light-collection device, and the energy detectors; while FIGURE 5 diagrams the circuitry associated with the servo-amplifier and related motor which form part of my control system;

FIGURE 6 is a scattering diagram for light scattered from spheres;

FIGURE 7 is a graph of the total scattered energy plotted as a function of the scattering angle.

Throughout the several views of the drawings, like reference characters denote like parts.

Illustratively, mower 1 (FIGURE 1) is of the horizontal rotary-blade type, with vertical spindle. Conveniently, however, this mower could be of the reel type. Alternatively and without departure from the underlying spirit of my invention, the control apparatus and related system which I shall disclose can be associated with a wide variety of land-working equipment.

Figure 1:
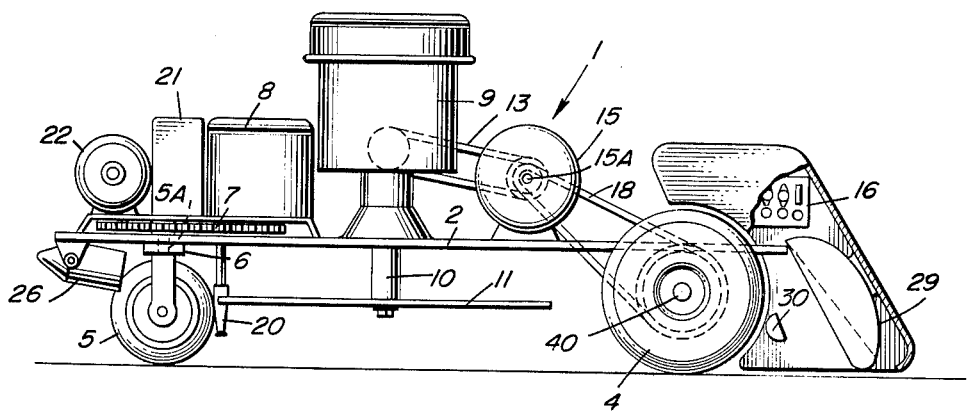
Figure 2:
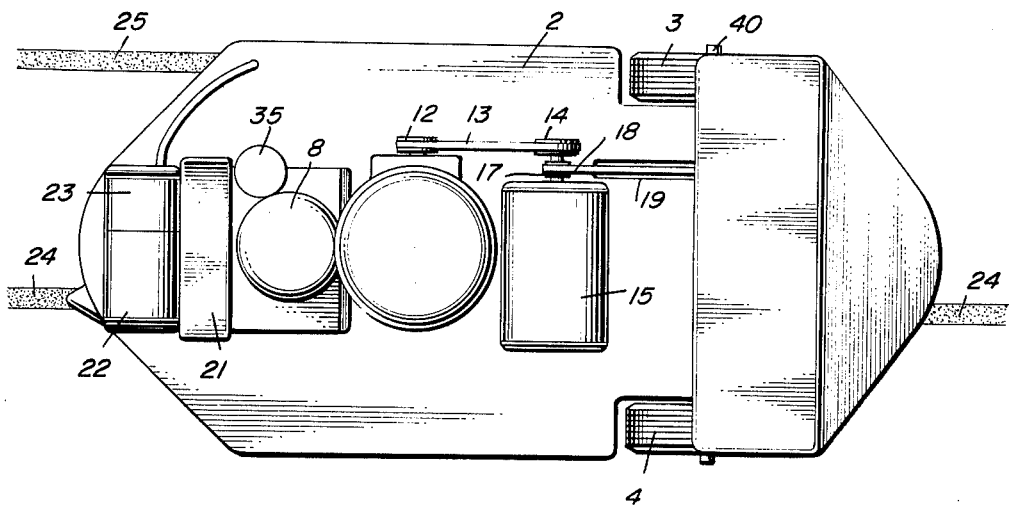

Referring now more particularly to the disclosure of FIGURES 1 and 2, here power mower 1 includes frame 2. This frame 2 is supported in part on front wheels 3 and 4 (FIGURE 2). Wheels 3 and 4, comprising traction or drive wheels, are powered in convenient and conventional manner from related gasoline or similar propulsion engine 9, later to be described. Conveniently, I mount a single guide wheel 5 at the rear of frame 2. Wheel 5 serves to guide mower 1.

To impart requisite guidance potential to wheel 5, and to provide for rotation through vertical angle, I suspend this wheel on king pin 5A, from overlying bearing 6. Bearing 6 is carried on frame 2. I connect this guide wheel 5 mechanically, through kingpin 5A, to and through a sequence of gears 7, to servo-motor 8. It is this motor 8 which, through gear train 7, revolves, to controlled extent, the guide wheel 5 in its passage through vertical angular sweep. This guidance control will be more particularly described at a later point in this disclosure.

Gasoline engine 9, of conventional type, serves to propel the lawn mower 1. I mount this engine 9 on frame 2 in such manner that the drive shaft 10 of engine 9 is disposed in vertical plane. Cutter blade 11, horizontally disposed, is conventionally and removably locked to drive shaft 10, at or near the lower extremity of the latter.

As part of my control system, I provide electric generator 15 carried on frame 2. This generator 15 has conventional mounting, indicated schematically in FIGURE 1. Generator 15 is powered from engine 9 through drive pulley 12 on engine 9, belt 13, and driven pulley 14, the latter being mounted at the end of the shaft 15A of generator 15.

This generator, developing alternating current supply at selected output of approximately 110 volts, serves both to energize the amplifier circuit 16 and the servo motor 8, both to be described hereinafter in greater detail. And of course, this generator 15 has included as part thereof, essential gearing, conventional in nature, for rotating the poles of the generator at speed proper to generate required voltage at such times as the gasoline engine 9 has rotational speed rated for the generation of this required output voltage.

Consideration of FIGURE 2 discloses that I mount a second pulley 17 on the main or drive shaft 15A of generator 15. Belt 18 serves to take off power from driven pulley 17, delivering mechanical and rotational energy directly to the front wheels 3 and 4 of the lawnmower, and thus driving the latter. To this end, I pass belt 18 through slot 19 (FIGURE 2) in the floor of frame 2. Briefly, then, wheels 3 and 4 are powered from the horizontally-disposed drive shaft of motor 9, through pulley 12 mounted thereon, belt 13, generator shaft 15A, pulley 17, and belt 18, and thence directly to a suitable driven pulley mounted on the drive wheel shaft 40. This latter feature is conventional in nature and does not per se comprise part of my invention. According, and for simplicity and clarity, I do not describe this in detail.

It is proper at this time, for thorough understanding of my invention, to digress for a moment as to the operation of the equipment described in the foregoing.

First of all, then, the mower is guided manually around the area to be mowed, in an initial pass or phase. And for the equipment which I here disclose, this initial pass is in counter-clockwise direction. Of course, however, it is entirely possible, with no exercise of inventive faculty, to reverse the control equipment which I provide, thus enabling clockwise rotation in such initial pass. In the first and manual pass, I effect guidance of my lawn mower through a handle (not disclosed), which I attach to frame 2.

Now, near the rear of the mower 1 as disclosed in FIGURE 1, and closely adjacent guide wheel 5, I provide spray nozzle 20. This nozzle I asociate in practically direct connection to a storage tank 21, for storage of a spray mixture. In tank 21 I provide a quantity of liquid, illustratively water, in which I suspend a large quantity of solid spheres, each such sphere being nearly uniform and of extremely small diameter. During initial and manual pass of the mower around the periphery of the area undergoing processing, I deposit onto the underlying ground a guidance path from spray nozzle 20. The liquid content of the path thus deposited evaporates shortly following initial contact with the ground. And this ground, be it grass-covered, bare, or the like, has left thereon, and in intimate contact therewith, a perceptible covering of these small spherical particles. I prefer the use of spherical particles having regular shape and configuration. This is because of the regular and reliable pattern of scattered light emergent therefrom.

From the foregoing, it becomes apparent that in this initial and manually-guided pass of mower 1 or the like about the periphery of the area undergoing treatment, I lay down a path which is admirably suited for guidance purposes. To this end I have employed the essential principle of my invention, as will be more fully described hereinafter.

Illustratively, I drive mechanical sprayer 23 through motor 22. This motor 22, if mechanical, may be belted to gasoline engine 9. If electrical, it may be driven by simple circuitry from generator 15. The pressure sprayer 23 is interposed between storage tank 21 and spray nozzle 20. It directs liquid content of tank 21 into spray nozzle 20.

A path such as laid down from nozzle 20 (FIGURE 1) during the initial, manual pass of mower 1 is indicated generally at 24 in FIGURE 2. With path 24 thus deposited, this path is next employed in the second pass or circuit of mower 1, for guiding the latter during the course of such passage. At the same time, a second path 25 (indicated at the top left of FIGURE 2) is undergoing deposition, for guiding mower 1 during its next successive circuit. In reality, this section of path 25 is continuous with first section 24. This is so, consistent with complete path of continuous and spiral configuration, as will be developed.

Figure 3:
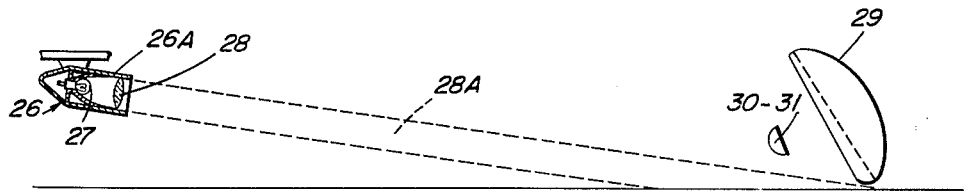
Figure 4:
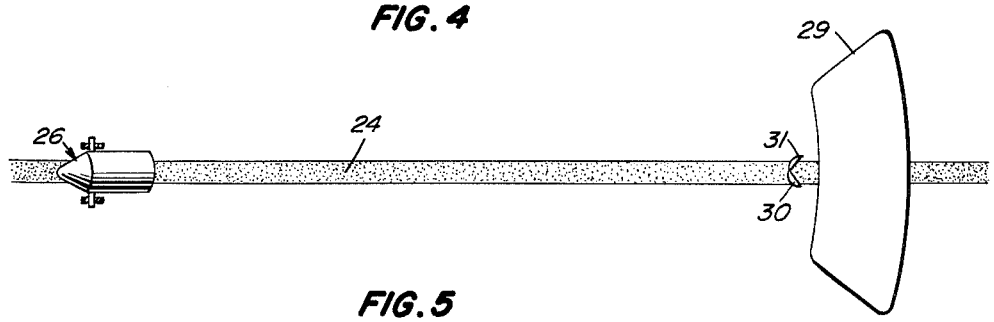

Now with reference had to the schematic disclosure of FIGURES 3 and 4, taken in conjunction with the physical structure disclosed in FIGURES 1 and 2, then with this correlation, understanding may be gained of the mode in which I utilize guidance path 24 for automatically guiding mower 1 or similar vehicle in subsequent passage thereof.

To this end I provide a source of light 26 (FIGURE 1) which I suspend from frame 2 near the rear thereof. The components of this light source 26 comprise a housing 26A, and within the same (FIGURE 3) a filamentary lamp 27 or other suitable and conventional source of requisite electromagnetic energy. And with this I relate a suitable lens 28. I aim light source 26 downwardly and forwardly. This housing 26A for light source 26 I dispose with a projection of its axis of major intensity at an angle of about 10° to the ground. The relation between lamp 27 and lens 28 is such that a beam of light, comprised of generally parallel rays, and of relatively small diameter (approximately that of lens 28) is directed forwardly and downwardly towards the ground, and along said approximately 10° angular path.

The geometry and phenomena of the light-scattering or reflection from the particles of light-reflecting media which comprise path 24, as hereinafter more fully explained, is such that by far the larger part of the energy which is reflected from this path is directed into a cone, the axis of which cone is the original direction of the light, and the angular diversion of which, at the apex of the cone, is relatively small.

In the graph found at a later point herein (having particular reference to FIGURE 7 herein), total scattered energy is plotted against the scattering angle. It it apparent from a consideration of this FIG. 7 that, illustratively, by far the greater part of the energy is scattered into a cone which has a half angle at its apex, of about 70°.

For receiving the light which is reflected from path 24 I provide a mirror 29 (FIGURES 1, 3 and 4) near the front end of mower 1. I so position, mount and construct mirror 29 that its principal axis is directed downwardly and rearwardly towards path 24 at an angle to the ground roughly from about 25° to about 50°, and so that it intercepts a large fraction of the light energy which is reflected and scattered from path 24. Typically, approximately one-third of the scattered energy is incident upon, and is picked up by, mirror 29.

I provide photosensitive detectors 30, 31 in close association with mirror 29, and near the focal point of this latter (see FIGURE 4 and as well, FIGURES 1 and 3). Illustratively I carry these detectors from a suitable projection on frame 2.

When mower 1 or other suitable mobile unit is in its normal position relative to guidance path 24, and is closely tracking along the same then obviously, equal quantities of the light energy which is picked up by mirror 29 from the scattered radiation caused by light beam 28A, are incident upon these detectors 30 and 31. When this condition maintains, no differential energy is transmitted to servo-motor 8. Thus deenergized, this motor 8 remains immobile and in its rest position. By consequence, guide wheel 5 (FIGURE 1) which, it will be recalled, is located at the rear of mower 1, remains with orientation functionally parallel and in line with front wheels 3 and 4. The momentary direction of movement of the mower 1 remains unchanged.

If now, however, the front end of mower 1 deviates, say to the right, of its normal position relative to guide path 24 and trends away therefrom, then a greater part of the energy picked up by and reflected from mirror 29 is incident upon detector 30 (this detector 30 is located on the right or lower side, as shown in FIGURE 4) than is incident upon detector 31. It becomes evident that a differential signal is thus detected. And this differential signal is amplified in the circuit 16 (the physical embodiment of which is disclosed at the top right in FIGURE 1), a detailed and typical embodiment of which circuit is disclosed in FIGURE 5.

The amplified and differential signal thus received serves to energize servo motor 8, bringing this into rotation. The direction of such rotation is determined by the direction of this differential signal. It is the rotation of motor 8, in direction thus determined, which results in a restoring action or guidance, imparted through gearing 7 to guide wheel 5, and in sense compensating for the wander theretofore detected. Guide wheel 5, with correction imparted thereto as thus determined, serves to direct and guide the front end of the mower back to the left, until a neutral position of mower 1 is regained, relative to and along guide path 24.

Should, on the contrary, it be the left towards which the front end of the mower veers, in direction away from and out of its normal position, then in such case the preponderance of scattered energy picked up by mirror 29 is directed to and is incident upon and detected by detector 31. The operation which now takes place is just the reverse to that just hereinbefore described. Motor 8 now tends to turn wheel 5 in the reverse direction, and in counterclockwise revolution as viewed in FIGURE 2. The correction thus imparted restores the front end of mower 1, in clockwise sense, back to the right.

This "hunting" and differential action, thus described, continues in manner such that at all times mower 1 tends closely to follow guidance path 24. The circuit diagram of FIGURE 5 clearly discloses the foregoing.

Figure 5:
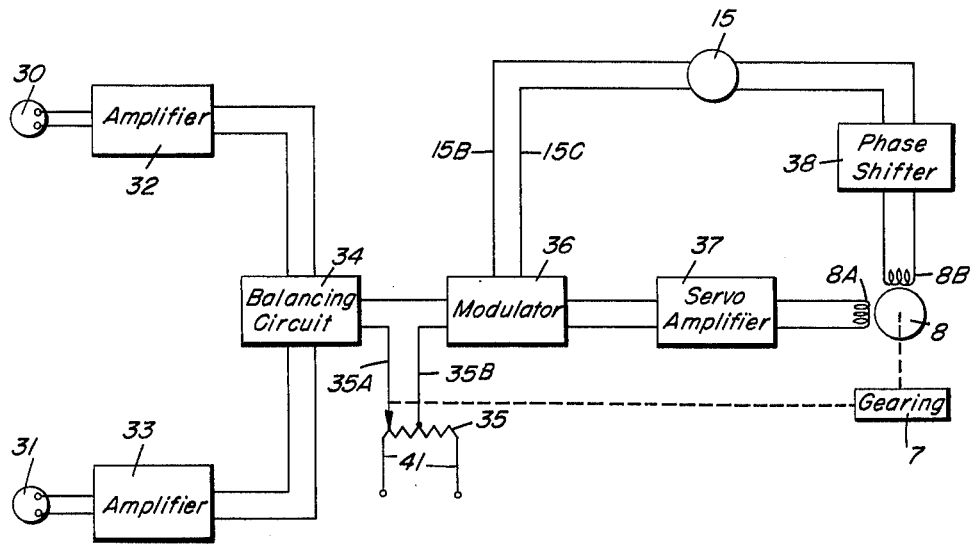

Having reference to FIGURE 5, the output of detector 30 is amplified by conventional direct current amplifier 32. Similarly, output of detector 31 is amplified through conventional direct current amplifier 33. The outputs of these amplifiers 32 and 33 are bucked against each other in balancing circuit, conventionally indicated at 34. And this balancing circuit 34 produces a differential output only when the input voltage from the two amplifiers 32 and 33 assume unlike values. The momentary polarity of output voltage from balancing circuit 34, i.e. direction of flow of current therefrom, depends upon which amplifier momentarily imposes a higher voltage on this balancing circuit 34. A potentiometer 35, having imposed thereon a source of constant voltage supply 41, is so connected with differential output from circuit 34 that voltage difference obtains between the slide contact 35A of the potentiometer and its fixed contact 35B, and in turn, is impressed on modulator 36. But this takes place only when the guide wheel 5 is so turned that it no longer tracks closely with respect to guide path 24, but is tending to deviate from this path.

It is a direct corollary of the foregoing, that should imbalance exist in the output of the detectors 30 and 31, a condition which maintains only when mower 1 is not directly over the guidance strip 24, then the balancing circuit 34 will produce differential output signal in response thereto. And the circuitry disclosed in this FIGURE 5 is such that the differential signal from the balancing circuit 34 thus produced, with polarity thereof determined by the direction of deviation of mower 1 from the guidance path 24, is electrically compared with the output of the potentiometer. And it is this output which is proportional to the angular deviation which the guide wheel 5 makes with respect to the front wheels 3 and 4.

Through variation of the constant voltage input to potentiometer 35, this being an input obtained from conventional direct current power source 41, the output of this potentiometer 35 can be so regulated that it equals and cancels out the output of the balancing circuit 34 at all such times during which guide wheel 5 of mower 1 remains oriented so that it will bring mower 1 into required centering over guide strip 24. Should, however, guide wheel 5 not be in such position, then a differential voltage is brought into existence on the input side of modulator 36. In manner shortly to be explained, this differential voltage energizes servo motor 8 so that it will drive gear train 7 and through it, the guide wheel 5 into proper guiding position of the latter.

Now, it is apparent from the circuitry of FIGURE 5 that the input impressed on modulator 36 will be a direct current signal. Typically, I selected a modulation 36 of the standard ring type. And I provide leads 15B, 15C interconnecting this modulator 36, in alternating circuit, with generator 15. Required modulation is achieved through the impression of variations in this direct current input to modulator 36, on its alternating current input from generator 15. From the output side of modulator 36 the alternating voltage, thus varied or modulated by the direct current which is impressed thereon, passes directly to and is amplified within servo amplifier 37, of conventional design, and which is disposed in series connection therewith.

Finally, the modulated output of generator 15, amplified at servo amplifier 37, is impressed on a selected one of a plurality of coils, say coil 8A, of servo motor 8. This energizes the motor 8 in a desired direction of rotation. It will be recalled that it is this motor 8 which, through gearing train 7 schematically disclosed in FIGURE 5 and further disclosed in greater particularity in FIGURE 1, energizes and rotates guide wheel 5 to required extent, through horizontal angle and about a vertical axis.

Upon phase shift of 90° in the voltage which is impressed on phase shifter 38, it is the other coil 8B of servo motor 8, which second coil is disposed in quadrature with first coil 8A, which is energized from generator 15. And at this time, the first coil 8A is deenergized and hence is rendered inactive. Thus energized, motor 8 rotates in direction opposite to that first described.

As hereinbefore indicated, the servo motor circuitry is largely conventional, a suitable circuit of this general type being disclosed, illustratively, in United States Patent to Null, No. 2,751,030. Similarly, a description of standard practice in the servo mechanism field can be found in "Servomechanism Practice" by Ahrent and Savant, published by McGraw-Hill in 1960.

While I have disclosed my invention as directed largely to a rotary lawn mower of a type completely familiar to the home owner, such disclosure has been entirely illustrative. And my control system is equally suitable for commercial and industrial equipment, such as harvester, seed-planting equipment, plows, rakes, harrows, and the like. And while I have sometimes referred to the equipment and related control system, all according to the practice of my invention, as being semi-automatic in character, this is simply for the reason that an initial pass around the work area is under the manual control of the operator. It is during this pass that there is laid out, determined and defined, the periphery of a selected area. It is this guide path which is laid down on the ground during this initial pass, functionally comprising the outermost turn of a continuous spiral, which serves thereafter as guide for the automatically-controlled mobile equipment.

It is apparent from the foregoing, however, that even during this first and manually-controlled pass, the automatic guidance system according to my invention is brought into play, and initiates its control action. For the control system, during this passage, lays down on the underlying ground what comprises a continuous control path, pattern or strip. And this strip or path can be sensed by the control system on the lawn mower or the like, during the next subsequent and automatic pass thereof. The result is such that the lawn mower is automatically guided in such subsequent circuits, each of continuously diminishing size, and all with constant pitch. During each such pass, the machine continues to lay down the guidance strip. By consequence, there results something in the nature of an involute or functionally akin to a spiral path, having internal apex. Thus, and with self-propelled machine, in each subsequent pass around the diminishing area delineated by the initial periphery, the machine senses and automatically follows the guidance strip which has been laid down in the initial pass.

With guidance strip thus being continuously deposited upon the ground, it will be seen that this latter serves as a guidance control, directing the automatic operation of the machine. Cessation of work function is determined by exhaustion of the continuously diminishing work area. Reduced to simplest terms, the machine simply follows a generally spiral path, using the strip laid down during one 360° pass around the work area, for guidance in the next subsequent pass. With the foregoing in mind, it is readily apparent that manual guidance is required only for initial pass. Subsequent operation is entirely automatic, up to and including terminal pass of the machine. Now, with all the foregoing developed, it is in order to give consideration to the reasons dictating a control system of the type described, and employing a supply of light-reflecting particles.

My extended research and experiments have completely demonstrated that primary importance attaches to the distribution on the ground of a path of guidance material of extreme fineness, which path is later to be detected by the sensing mechanism, thereby serving to guide the particular land-working device. It is essential, from a practical standpoint, that only a small quantity of material be deposited on the ground, yet being sufficient to provide accurate and certain guidance for the related machine. As concerns this, calculation quickly demonstrates that were materials in conventional forms to be employed in requisite quantity to impart certainty to guidance, then the total quantity of material thus required quickly assumes prohibitive proportions. Illustratively, assigning reasonable value to width of strip of say ½ an inch, using a household mower cutting a 20 inch swath and assuming a 50% overlap of such swath from one passage to another, then we find that, were for example aluminum foil say of 0.001 inch in thickness to be employed as the guidance material, a full 30 pounds of aluminum foil would be required for guidance over but a single acre of ground. Obviously, this very practical requirement quickly eliminates a great variety of materials. For nearly all of the materials otherwise suitable for such guidance strips require even thicker deposits than the illustrative case of aluminum, heretofore assumed. And by consequence, even a greater quantity of guidance material per acre is demanded for accurate guidance signal. And this is so, even assuming minimum width and thickness of the guidance strip itself. Obviously, and as stated, this is prohibitive. And something must be done to avoid this situation, if such type of control is to be made practical.

Now, as already developed, deposition of material in ordinary form, and in a strip sufficiently wide to function properly, demands prohibitive quantity of material. It becomes necessary, therefore, to evolve a method of providing adequate guidance strip, while using an extremely small quantity of light-scattering material. Expressed in other words, this simply means that the effective thickness of the strip must be made quite small. A further requisite is that the strip always scatters a significant portion of the energy which is incident upon it, to the region of the machine in which the light detectors are located. Emphasis must be directed to the configuration of the material and to the mode of distributing it.

Upon further research I find that multiple advantages attend utilization of what I term electromagnetic energy. Illustratively, such equipment as is employed following such practice is itself readily available and comparatively inexpensive. Moreover, the broad electromagnetic spectrum which can be utilized permits close selection of proper and convenient range of wave length. It was only after much study, however, that I evolved such a strip, together with manner of distributing it, which was really practical.

For proper understanding, let us give consideration for the moment, theoretically, to the emission of electromagnetic energy, of which visible light is but typical. Conveniently, let us designate such electromagnetic energy by the general term "light." I will use this term to indicate both visible light and as well, other forms of electromagnetic energy having wave length either longer or shorter than that of the visible region of the light spectrum. It is recognized that a light wave, when incident upon a particle of matter, energizes the electrons thereof in manner such that they oscillate periodically in response to variations in the intensity of the electric field of the incident light. The transmitted energy represents a combination of the incident or original light wave, together with secondary radiation emitted from the electron oscillation. This combination of original and secondary radiation will assume a variety of distributions.

It is this scattered energy, i.e., the combination wave, which may be described generally as follows:

The direction of the original, incident or primary wave we will assume to be at a zero degrees line. With this reference datum, the angle between this direction (that of the original wave) and any other direction, as with the particle at the intersection, will accurately describe this latter direction. Illustratively, we speak of scattering at 90°. This means scattering in a direction perpendicular to the direction of the incident beam. That is, along the perpendicular which intersects the incident beam at the particle, which serves as a reflecting medium. Similarly, when we refer to radiation at 180°, this means that the light has been completely reversed in direction, and is returning in a direction opposite to that of its original passage. From the foregoing, it becomes evident that it is entirely possible for the scattered wave to assume a great variety of distributions in space.

My exploration further establishes that the particular distribution or posture assumed depends in large measure on the ratio of the circumference of the particle (assuming a spherical particle) to the wave length of the light. With ratio quite small (as is the case where the wave length of the light is much greater than the dimensions of the particle), then I find that the light will be scattered uniformly in all directions. This may be illustrated in a graph of intensity plotted as a function of the angle of reflection (the angle described in the foregoing). It shows the same value of intensity for all angles. This is but another manner of saying that such a graph will comprise a straight line extending horizontally.

Now, should this ratio of particle circumference to wave length of the incident light be quite large, which would be the case where the particles comprise spheres large in comparison to the wave length of the incident light, then nearly all of the scattered light will be directed to angles closely approximating zero degrees. This simply means that the direction of the light, if varied at all, is changed but little.

Finally, when ratio of particle circumference to the wave length of incident light approaches unity, a more complicated situation is brought about. A further influencing factor upon the pattern of scattering, and to which consideration must be given, is the relative index of refraction of the material of the particle, on the one hand, and the gaseous medium through which the scattered radiation is transmitted (usually air) on the other hand. By definition, this is the ratio of the velocity of light in the gaseous medium (air) to the velocity of light internally of the particle. Denoting this parameter by the letter "$n$," we will give consideration for one or two instances, only. Generally speaking, we need not be overly concerned with this value.

With the foregoing theoretical consideration made available, we are now in a position to recognize the manner in which I employ in my present invention, the light scattered from spherical particles of proper size.

To illustrate the foregoing, attention is now invited to the foregoing FIG. 6, which is a scattering diagram for light scattered from spheres. Therein, with circumference to wave length ratio of 2.5 and with a parameter of $n$ equal 1.55, relative intensity of scattered light is plotted as a function of the scattering angle, expressed in degrees. More specifically, the ratio of the circumference of the particles from which the light is scattered to the wave length of the incident light is 2.5, while the relative index of refraction is 1.55. Consideration of FIG. 6 shows that the scattered light is principally directed forwardly. However, the distribution is rather broad. Considerable intensity still exists at 60°.

Following the practice of my invention, the path laid down by the lawn mower 1 is composed of particles which give, with the wave length of the light employed, a scattering pattern closely following FIG. 6. And there are enough particles per unit area of the path thus defined, that a significant fraction of the light falling on the path is scattered into the angles as indicated in this FIG. 6. For proper utilization of this pattern, the source of light 27 provides narrow beam, striking the ground at a grazing angle of about 10°. The beam of reflected light, scattered from the particles on the ground, is incident upon mirror 29 after making an agle from 15° to about 40° with the ground. This means that the total angle between the original light beam and the scattered directions of the beam ranges from about 25° to about 50°. Thus, and as can be seen from FIG. 6, and somewhat more easily from the following FIG. 7, a large portion of the scattered light can be picked up by the mirror 29 and detectors 30 and 31.

FIG. 7 is a graph of the total scattered energy as plotted as a function of the scattering angle. The material for FIG. 7 is obtained from that disclosed on FIG. 6, by multiplying the values of intensity by the sines of the scattering angles.

It now follows that the choice of the particle size and of the associated wave length of the light source can be such that only a very small quantity of material is required for proper guidance path, thus satisfying a primary object of my invention.

One such choice is that of spheres of sulphur, the spheres having a circumference of 0.56 micron. In this instance, and with a ratio of circumference of particle to wave length of the light of 2.5, a source of light is selected having a wave length of approximately 0.70 micron. In accordance with this practice, only 5 ounces of material is required to satisfy the illustrative example heretofore given. With effective thickness of the path reduced by factor of more than 50, it will be readily seen that there directly attends the practice of my invention, a very great reduction to but 5 ounces from the 30 pounds of aluminum which would be necessary to satisfy the guidance path were foil of 0.001 inch in thickness employed.

While I have initially disclosed the use of sulphur particles, it is entirely practical and feasible to replace the sulphur spheres by preformed glass spheres of the same diameter. Alternatively, tank 21 may contain a solution of plastic suspended in solvent, the mixture being extruded through the nozzle 20, now serving as an extrusion nozzle, the nozzle 20, in such instance, having such diameter, and its outlet being positioned at such heighth above the ground, that the plastic settles upon the ground in the form of true spheres, of required circumference.

It is to be noted that provided only the ratio of the wave length of the electromagnetic radiation and the size of the particles be kept substantially constant, these wave lengths of the energy incident upon the particles as deposited on the ground and the size of the particles employed may be diminished to the lowest practical value.

All the foregoing, as well as many other highly practical objects and advantages attend the practice of my invention.

It is apparent from the foregoing that, once the broad aspects of my invention are disclosed, many embodiments thereof will readily suggest themselves to those skilled in the art. And that as well, many modifications of the disclosed embodiments will be evolved, all falling within the spirit and scope of this disclosure. Accordingly, I intend such disclosure to be considered as simply illustrative, and not as comprising limitations.

I claim:

1. In combination, a mobile off-the-road land-working machine with included drive means, at least one guide wheel means revolvable about a vertical axis, and servomechanisms for controlling the guide wheel means; and a control system on said machine for operating said servomechanisms, and which control system comprises means for depositing on the ground a guide trace formed of separate and discrete, spherical, light-scattering particles having small diameter less than five microns; a light source mounted rearwardly of said machine and aimed downwardly and forwardly towards said path of light-scattering particles at an angle of approximately 10° with respect thereto, the diameter of said light-scattering particles being of the same order of magnitude as the average wave-length of the light emitted from said light source; a light-gathering mirror disposed forwardly of and on said machine and aimed rearwardly and downwardly towards said path of light-scattering particles and serving to pick up scattered light from said particles; and photo-sensitive differential electrical circuitry for controlling said servomechanisms and including a plurality of detectors on which the light reflected from said mirror is differentially incident in dependence upon the instantaneous relation of the machine to the guide trace; said servomechanisms, under the control of said circuitry, imparting correcting movements to said guide wheel means when the machine tends to deviate from the guide trace as laid down from the machine during a prior passage thereof over the area being traversed by said machine.

2. In combination, a mobile off-the-road land-working machine with included drive means, at least one guide wheel means revolvable about a vertical axis, and servomechanisms for controlling the guide wheel means; and a control system on said machine for operating said servomechanisms, and which control system comprises means for depositing on the ground a guide trace formed of separate and discrete, spherical, light-scattering particles having small diameter less than five microns; a light source mounted rearwardly of said machine and aimed downwardly and forwardly towards said path of light-scattering particles at an angle ranging from about 0° to about 20° with respect thereto, the diameter of said light-scattering particles being of the same order of magnitude as the average wavelength of the light emitted from said light source; a light-gathering means capable of reflection disposed forwardly of and on said machine and aimed rearwardly and downwardly towards said path of light-scattering particles and serving to pick up scattered light from said particles; and photo-sensitive differential electrical circuitry for controlling said servomechanisms and including a plurality of detectors on which the light reflected from said light-gathering means is differentially incident in dependence upon the instantaneous relation of the machine to the guide trace; said servomechanisms, under the control of said circuitry, imparting correcting movements to said guide wheel means when the machine tends to deviate from the guide trace as laid down from the machine during a prior passage thereof over the area being traversed by said machine.

3. In combination, a mobile off-the-road land-working machine with included drive means, at least one guide wheel means revolvable about a vertical axis, servomechanisms for controlling the guide wheel means and a control system on said machine for operating said servomechanisms, and which control system comprises means for depositing on the ground a guide trace formed of separate and discrete, spherical, uniformly-sized light-scattering particles having small diameter less than five microns; a light source mounted rearwardly of said machine and aimed downwardly and forwardly towards said path of light-scattering particles at an angle ranging from about 0° to about 20° with respect thereto; the size of particles and the source of light being so selected that the ratio of the circumference of said uniformly-sized particles to the wave-length of said light is approximately 2.5 to 1; a light-gathering means capable of reflection disposed forwardly of and on said machine aimed rearwardly and downwardly towards said path of light-scattering particles and serving to pick up scattered light from said particles; and photo-sensitive differential electrical circuitry for controlling said servomechanisms and including a plurality of detectors on which the light reflected from said light-gathering means is differentially incident in dependence upon the instantaneous relation of the machine to the guide trace; said servomechanisms, under the control of said circuitry, imparting correcting movements to said guide wheel means when the machine tends to deviate from the guide trace as laid down from the machine during a prior passage thereof over the area being traversed by said machine.

4. In association with both a related mobile carrier therefor, and with a path delineated on the ground by light-scattering, separate and discrete, spherical particles laid down from said mobile carrier, a light-transmission assembly comprising, in combination, a source of light directed downwardly to said path of light-scattering particles at an angle of approximately 10° with respect thereto; the diameter of said light-scattering particles approximating the average wave-length of the light emitted from said light source; a light-collecting device disposed forwardly of said light source, and aimed rearwardly and downwardly towards said path, at an angle to the ground ranging from about 15° to about 40°, for sensing and collecting light selectively scattered from said path; and means disposed functionally on opposite sides of said light-collecting means, for differentially receiving light energy collected by said last-mentioned means.

5. In the method of automatically directionally controlling the guidance of over-land mobile vehicles wherein is laid down on the ground a path of uniformly-sized light-scattering particles, which path is to be followed, the sequential steps of (1) directing a beam of light, the average wave-length of which with respect to the circumference of the uniformly-sized light-scattering particles is approximately 1 to 2.5, downwardly on the ground from the vehicle to be guided; (2) picking up from the vehicle the selectively scattered light from said path; and (3) differentially employing the selectively scattered light thus picked up, to initiate and determine the direction and extent of the automatic directional control of the guidance of the vehicle.

6. An over-land mobile vehicle with automated directional control, comprising, in combination, a vehicle unit with included frame, traction wheels and at least one guide wheel; a servo-motor on said vehicle unit; a gear train also on said vehicle unit and related to said servo-motor and meshing with the said guide wheel for revolving the latter; means on said frame for laying down therefrom and on the ground a guidance trace made up of separate and discrete, uniformly-sized, spherical, selectively light-scattering particles of diameter less than five microns and the size of which said particles and the average wave-length of the light employed in connection therewith being of the same order of magnitude; means on said vehicle for directing downwardly therefrom, at an angle to the ground, a beam of light incident upon said spherical particles; light-collecting means on said vehicle and employed in connection with said beam of light, said last-mentioned means serving to collect light selectively scattered from said particles; and photo-sensitive differential electrical circuitry, with included photo-sensitive elements, on said machine, for differentially receiving energy from said scattered light collecting means in dependence upon the instantaneous relation of the vehicle to the guide trace and, as an incident thereto, differentially energizing said servo-motor, to cause the latter to correct, through said gear train, against deviation of the guide wheel from position tracking over said trace of selectively light-scattering particles.

7. In a guidance system for automatically guiding a land-working machine in its passage over a predetermined area to be worked; the method which comprises the sequential steps of laying down upon the ground a guide strip comprised of separate and discrete, uniformly-sized, spherical particles capable of scattering related electro-magnetic radiation employed in connection therewith, the size of which spherical particles and the average wave-length of said electro-magnetic radiation being of the same order of magnitude; directing a source of electro-magnetic radiation down upon said guide strip comprised of said separate particles; the size of said particles and the wave-length of said radiation, within the scope of being of the same order of magnitude, being so related to each other as to effect a pattern of scattered radiation having maximum intensity in predetermined orientation; and detecting from said machine, said scattered radiation in region of maximum intensity thereof.

8. The method of automatically guiding land-working vehicles, comprising (1) laying down on the ground from the related vehicle a guide trace of small spherical particles of substantially uniform size; (2) casting down from the related vehicle onto the trace thus laid down a beam of light from the light source carried on the related land-working vehicle, the particle size and the average wave-length of the emitted light being of the same order of magnitude, the light particles scattering from the trace a significant portion of the light incident thereon, to a light-sensing region on said vehicle; and (3) employing, on said vehicle and in its light-sensing region, the detected scattered light to effect differential guidance of the related vehicle.

References Cited by the Examiner
UNITED STATES PATENTS

| 2,074,251 | 3/1937 | Braun | 180—79.1 |
| 2,331,144 | 10/1943 | Sitter | 180—79.1 |
| 2,673,090 | 3/1954 | Blomberg | 275—8 |
| 2,751,030 | 6/1956 | Null | 180—79.1 |
| 2,833,542 | 5/1958 | Martin | 275—2 |
| 3,057,273 | 10/1962 | Wilson | 94—44 |
| 3,095,939 | 7/1963 | Hine | 180—7 |

BENJAMIN HERSH, *Primary Examiner.*

PHILIP ARNOLD, A. HARRY LEVY, *Examiners.*